United States Patent
Wu

(10) Patent No.: US 7,315,959 B2
(45) Date of Patent: Jan. 1, 2008

(54) REAL-TIME REMOTE BACKUP SYSTEM AND RELATED METHOD

(75) Inventor: Chih-Sung Wu, Taipei (TW)

(73) Assignee: ICP Electronics Inc., Shi-Chih, Taipei Hsien (TW)

( * ) Notice: Subject to any disclaimer, the term of this patent is extended or adjusted under 35 U.S.C. 154(b) by 501 days.

(21) Appl. No.: 10/709,426

(22) Filed: May 5, 2004

(65) Prior Publication Data

US 2005/0160313 A1 Jul. 21, 2005

(30) Foreign Application Priority Data

Dec. 30, 2003 (TW) ............................. 92137362 A

(51) Int. Cl.
*G06F 11/00* (2006.01)

(52) U.S. Cl. .................. 714/6; 711/161; 711/162; 707/204

(58) Field of Classification Search ............... 714/6
See application file for complete search history.

(56) References Cited

U.S. PATENT DOCUMENTS

| | | | | |
|---|---|---|---|---|
| 6,460,055 B1 * | 10/2002 | Midgley et al. | ............ | 707/204 |
| 6,618,818 B1 * | 9/2003 | Wahl et al. | ............... | 714/6 |
| 2002/0120785 A1 * | 8/2002 | Somalwar et al. | .......... | 709/310 |
| 2004/0064488 A1 * | 4/2004 | Sinha | .................. | 707/204 |
| 2004/0083245 A1 * | 4/2004 | Beeler | ................ | 707/204 |
| 2004/0210608 A1 * | 10/2004 | Lee et al. | ................. | 707/204 |

* cited by examiner

*Primary Examiner*—Michael Maskulinski
(74) *Attorney, Agent, or Firm*—Winston Hsu

(57) ABSTRACT

A real-time remote backup system and related method used for a network system connecting at least one source computer system and one destination computer system is disclosed. The system includes a loadable kernel module capable of presetting up at least one specific system call in the kernel space of the source computer system. Besides the kernel software, the specific system call can notify the loadable kernel module to generate a corresponding file modification message when a file modification event occurs in the user space of the source computer system. A scheduling module sequentially queues and implements the file modification messages from the loadable kernel module, and then generates a corresponding backup command according to each said file modification message. And, a network backup unit installed in the source computer system is facilitated to directly back up variant part of the file through the network system to the destination computer system when receiving the backup command transmitted from the scheduling module.

21 Claims, 3 Drawing Sheets

REAL-TIME REMOTE BACKUP SYSTEM AND RELATED METHOD

BACKGROUND OF INVENTION

1. Field of the Invention

The present invention relates to a real-time remote backup system and a related method, and more specifically, to a real-time network data remote backup system and a related method which are capable of dynamically backing up file modification among a plurality of LINUX computer devices.

2. Description of the Prior Art

As network technology progresses, Internet appliances (or called "information appliances"), such as a network attached storage (NAS) device composed of redundant arrays of inexpensive disks (RAID), are newly developed. Such NAS devices can be connected directly to a network system for allowing a remote user's computer system (source terminal) to store or download a large amount of data to/from the network storage device. In addition to user computer data storage, the NAS device can also be used as a remote backup system. However, in order to provide independent remote backup, the NAS device does not only need a random access memory (RAM) or a flash ROM, a plurality of hard disk drives (HDD) and IC controllers but also needs a specific embedded operating system (OS) and related applications. However, these OS and applications are all designed variously on base of demands of different manufacturers.

An automatic network backup software, called "RSYNC", has been introduced. The software was first written by Andrew Tridgell, and successively modified by other programmers all around the world. This software is a free-ware under general public license of GNU, which is easy to install and able to perform rapid backups. A computer system having RSYNC installed can be a client or a server, or both at the same time. When the backup process is executed on two computer systems having RSYNC installed, such as a client and a server, a checksum test will be performed according to an RSYNC algorithm, and then the client can setup a backup time to check the checksum in order to find modified parts of files and perform a backup to the server instead of transmitting the whole file. In such a manner, the transmission speed and the efficiency of the file backup are improved.

However, in order to improve the backup ability of RSYNC, the following items are suggested: Rather than performing periodic checks for file modifications, if any file modification event occurs, a client computer system in a Linux environment should immediately notify RSYNC to backup the modified file. However, if it is required to dynamically catch any file modification message and automatically notify RSYNC to perform a backup, in a Linux environment, the kernel of the OS is also required to be rewritten and debugged. This is a very complicated task for a programmer.

SUMMARY OF INVENTION

It is therefore a primary objective of the present invention to provide a real-time remote backup system and a related method utilized among a plurality of computer systems in a Linux environment. The system and the method can dynamically detect file modification events in a user space of a source computer system and automatically notify network backup software such as RSYNC to backup only the modified part to a destination computer system. Therefore, it can reach the objects that there are the reduced data loading and the faster transmission speed to raise the backup efficiency. Moreover, the system and the method can approach the synchronal update of the files between the source computer system and a destination computer system, as well as notify the programmer of the file modification without the need of rewriting the kernel of Linux.

Briefly summarized, a real-time remote backup system used in a network system interconnecting between at least one source computer system and one destination computer system is disclosed. Each computer system consists of a kernel space and a user space. The real-time remote backup system includes a loadable kernel module that pre-sets setting up at least one specific system call in the kernel space of the source computer system. The real-time remote backup system call notifies the loadable kernel module to generate a corresponding file modification message when a file modification event occurs in the user space of the source computer system. A scheduling module is used for sequentially queuing the file modification message from the loadable kernel module and then generating a corresponding backup command in response to the file modification message. At least one network backup unit is installed in the source computer system for backing-up the modified part of the file through the network system to the destination computer system when receiving the backup command from the scheduling module.

The present invention further provides a real-time remote backup system installed in a source computer system connected to a destination computer system through a network system. Each computer system includes at least one kernel space for a kernel and a user space for a network backup unit. The real-time remote backup system includes a loadable kernel module that pre-sets up at least one specific system call in the kernel space of the source computer system with removal of an original system call. The loadable kernel module generates a file modification message according to the type of the specific system call when a file modification event occurs to facilitate the specific system call notify the kernel. A scheduling module is for queuing the file modification message from the loadable kernel module and processing each file modification message to generate a corresponding backup command to the network backup unit of the source computer system so that the network backup unit backs-up the modified file to the destination computer system through the network system.

The present invention further provides a method of real-time remote backup used in a network system interconnecting between at least one source computer system and one destination computer system. Each computer system consists of a kernel space and a user space. The real-time remote backup method includes: implementing a specific system call that is pre-determined by a loadable kernel module loaded in the kernel space, to notify a kernel of the source computer system to modify a file; generating a file modification message according to the type of the specific system call which also notifies the loadable kernel module of a file modification event; queuing in sequence the file modification messages into a queue unit; sequentially taking the file modification messages from the queue unit to process and generate a corresponding backup command; and backing-up the modified part of the file by the network backup unit to the destination computer system through the network according to the backup command.

These and other objectives of the present invention will no doubt become obvious to those of ordinary skill in the art

DETAILED DESCRIPTION

Figure 1:
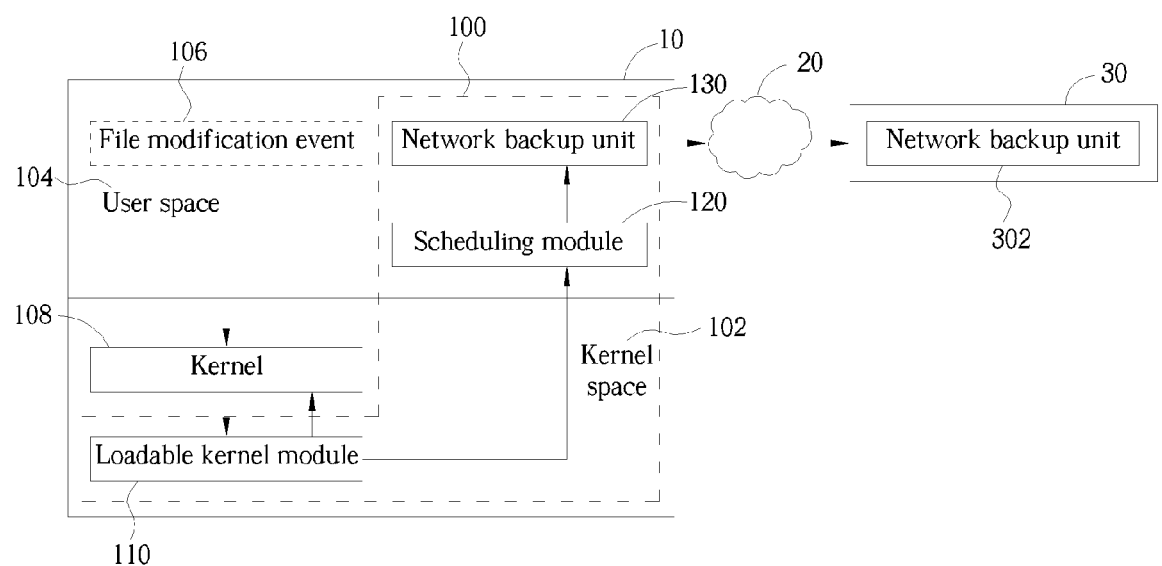
FIG. 1 illustrates a main structure of a real-time remote backup system utilized in a network system according to the present invention.

Please refer to FIG. 1 showing a real-time remote backup system 100 utilized with a network system 20. The network system 20 interconnects between at least one source computer system 10 and a destination computer system 30 in a Linux environment 30. Each computer system 10, 30 consist of a kernel space 102 having a kernel 108, and a user space 104.

The real-time remote backup system 100 has at least one loadable kernel module 110 installed in the kernel space 102 of the source computer system 10 for detecting whether a file modification event 106 has occurred in the user space 104. A scheduling module 120 installed in the user space 104 of the source computer system 10 sequentially queues each file modification message transmitted from the loadable kernel module 110 and process the file modification message to generate a backup command. A pair of network backup units 130, 302, such as a pair of RSYNC applications, is respectively installed in the user spaces 104 of the source computer system 10 and the destination computer system 30 to allocate the computer systems to be as a client and a server. When receiving the backup command from the scheduling module 120, the network backup unit 130 provides file modification backups to the network backup unit 302 of the destination computer system 30.

Figure 2:
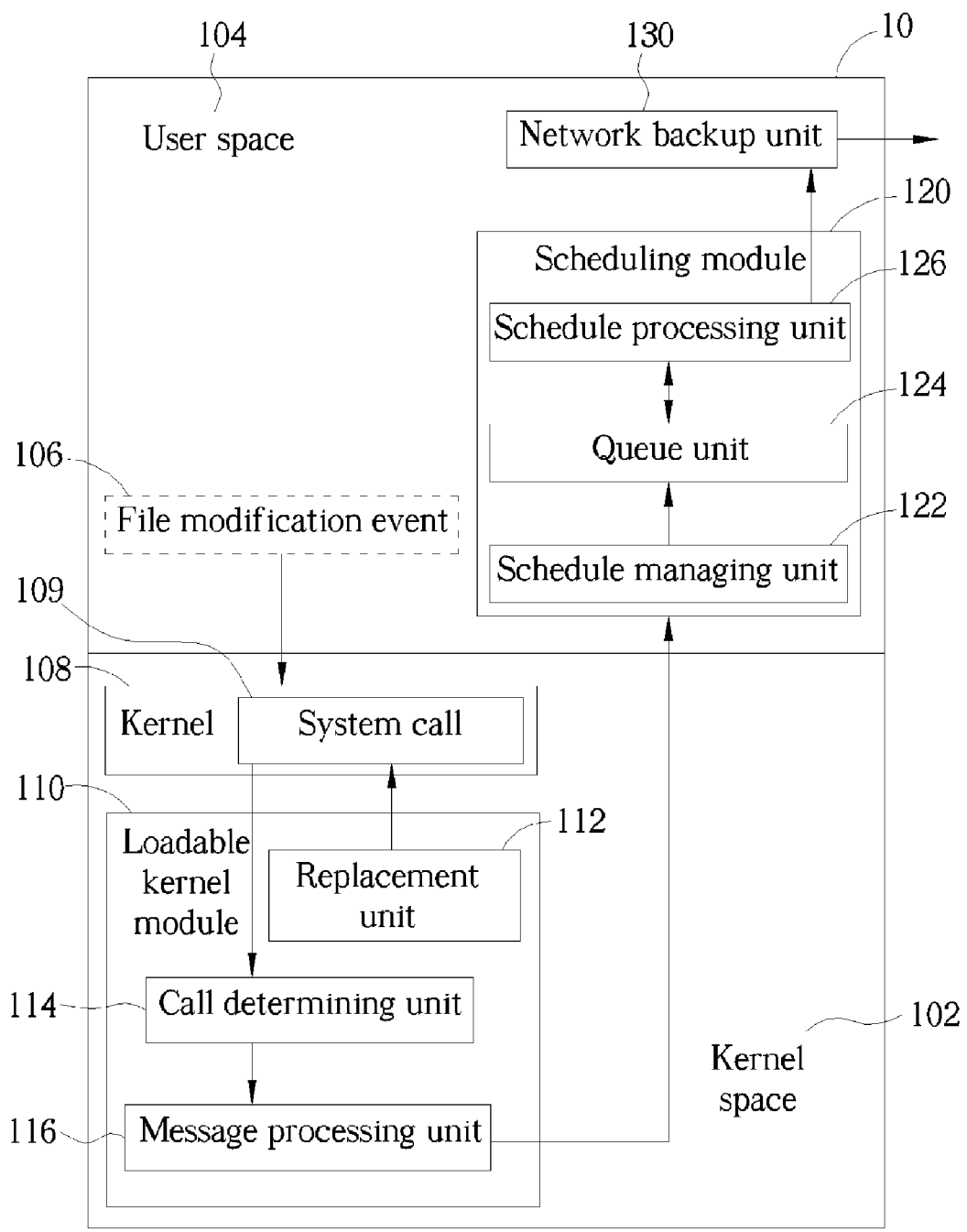
FIG. 2 illustrates a detailed structure of the real-time remote backup system shown in FIG. 1.

As shown in FIG. 2, the loadable kernel module 110 includes a replacement unit 112, a call determining unit 114 and a message processing unit 116. The replacement unit 112 replaces specific original system calls in the kernel space 102 with new system call 109 defined by the user. Actually, each system call is implemented as a function stored permanently in a memory. Whenever any file modification event occurs, such as deleting/saving a file, deleting/ establishing a directory, or closing a file, a corresponding system call has to be implemented to notify the kernel 108 of the file variance, as known. By way of replacing with the new system call 109, the notification of file modification event therefore can be fast obtained without need of modifying the kernel 108. When the new system call 109 is implemented, the loadable kernel module 110 can also be notified immediately of the file modification event. In addition, the real-time remote backup system 100 can include a graphical user interface (GUI, not shown) disposed with a network automatic backup switch for providing the user to switch on/off an automatic network backup function. When the user switches off the automatic network backup function, the replacement unit 12 of the loadable kernel module 100 will switch back to the original system call.

As described above, when the new system call 109 notifies the loadable kernel module 110, the call determining unit 144 of the loadable kernel module 110 first determines whether the new system call 109 is one of the predetermined system calls, such as SYS_RMDIR, SYS_MKDIR, SYS_RENAME, SYS_LINK, SYS_CHMOD, etc. If yes, the message processing unit 116 generates a corresponding file modification message including at least the filename and path of the modified file, to the scheduling module 120. If no, the system call is ignored and the process is terminated.

The scheduling module 120 includes a schedule managing unit 122, a queue unit 124 and a schedule processing unit 126. The schedule processing unit 14 and the schedule managing unit 126 use the same scheduling algorithm to process said file modification message generated by the message processing unit 116 of the loadable kernel module 110. The scheduling algorithm must be coordinated with the algorithm of the network backup unit 130 in order to prevent data from losing during data processing/transmission per step. Using the scheduling algorithm, the schedule managing unit 122 queues the received messages in sequence into the queue unit 124, and the schedule processing unit 126 reads out and processes each file modification message from the queue unit 124 in order to generate a corresponding backup command to the network backup unit 130. The backup command includes at least the path of the modified files. Additionally, the schedule processing unit 126 and the schedule managing unit 122 respectively have specific threads at least one of which is used to define an adjustable optimized time interval to limit and coordinate the message input/output and command transmission of the two units 122, 126 in the queue unit 124. However, as is known by a person skilled in the art, a device combining the two units 122, 126 would also belong to the score of the present invention.

When receiving the command corresponding to the file modification from the scheduling module 120, the network backup unit 130 executes a checksum test in the source computer system 10 according to the path of the modified file provided by the command in order to find the difference between the two files in the source computer system 10 and the destination computer system 30. Only the modified part is then transmitted to the destination computer system 30 through the network system 20.

Figure 3:
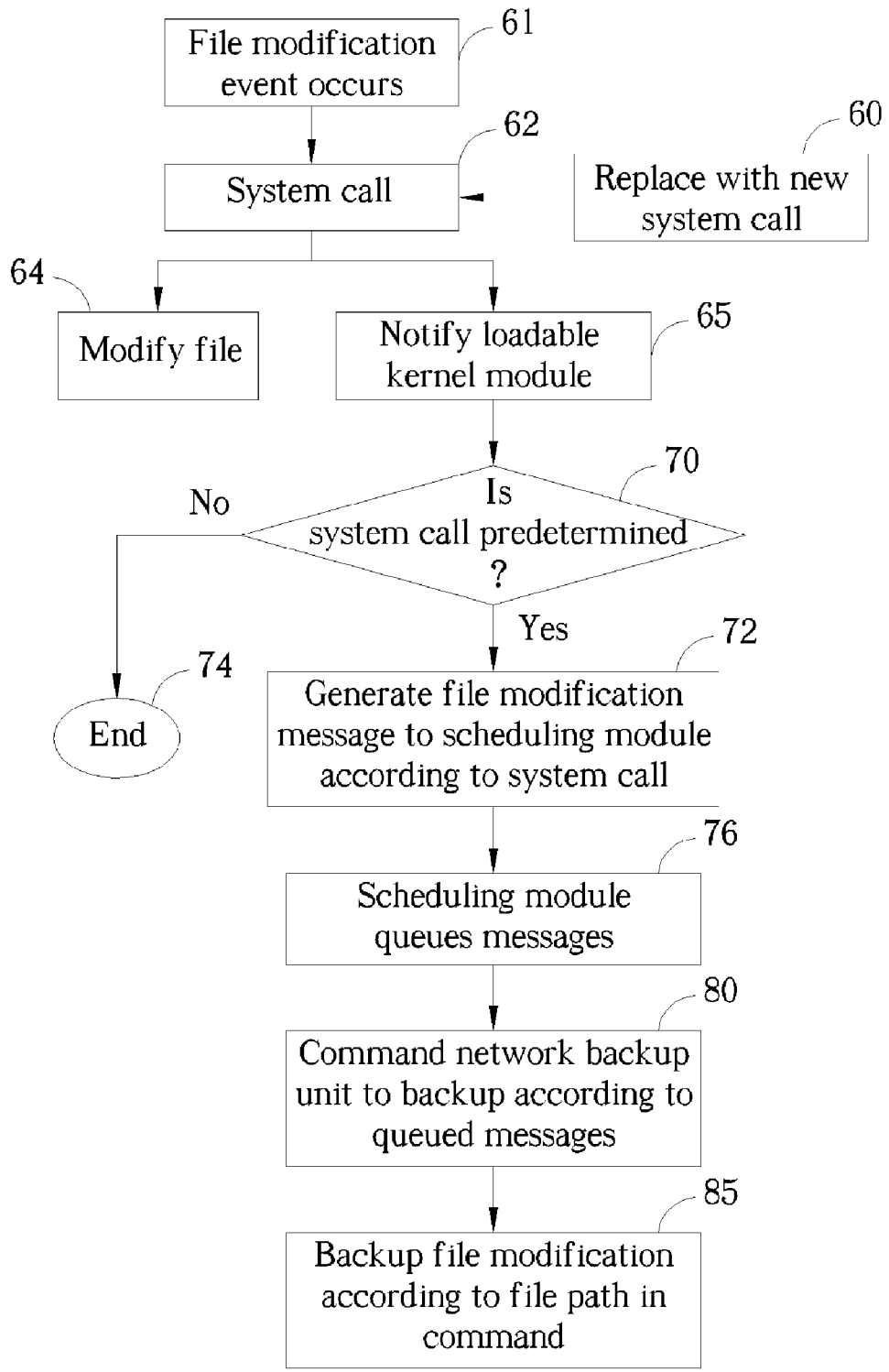
FIG. 3 is a flowchart of a method of real-time remote backup according to the present invention.

Please refer to FIG. 3 showing a method of real-time remote backup according to the present invention, including the following steps:

In step 60, replacing at least one original system call in the kernel with the new system call 109 in the loadable kernel module 110.

In step 61, a file modification event occurs, such as deleting/saving a file, deleting/establishing a directory, or closing a file, in the user space 104 of the source computer system 10. In step 62, implementing a corresponding predetermined system call 109 to notify the kernel 108 in the kernel space 102 for proceeding in Step 64, i.e. modify the file.

In step 65, when the new system call 109 is implemented, also notifying the call determining unit 114 of the loadable kernel module 110 of the file modification event.

In step 70, the call determining unit 114 of the loadable kernel module 110 determines whether the new system call 109 is one of the predetermined system calls, such as SYS_RMDIR, SYS_MKDIR, SYS_RENAME, SYS_LINK, SYS_CHMOD, etc. If yes, proceed to Step 72, the message processing unit 116 generates and sends out a file modification message including at least the filename and the path of the modified file to the scheduling module 120. And if no, proceed to Step 74, i.e. end.

In step 76, the scheduling module 120 sequentially queues the received messages into the queue unit 124.

In step 80, the scheduling module 120 reads/takes the file modification messages in sequence from the queue unit 124 to generate the backup command to the network backup unit 130. The command includes at least the path of the modified file.

In step 85, when receiving the command related to file modification from the scheduling module 120, the network backup unit 130 executes the checksum test in the source computer system 10 according to the path of the modified file provided by the command in order to find the difference between the two files in the source computer system 10 and the destination computer system 30. It then transmits only the modified part to the destination computer system 30 through the network system 20. However, the real-time remote backup system 100 according to the present invention is not limited to a network having a server and a client. A network having a plurality of servers and clients also belongs to the present invention.

In contrast to the prior art, the real-time remote backup system 100 and the related method according to the present invention dynamically captures file modification events to transmit them to the network backup unit 130. This is in contrast to, as the prior art, performing backups after a specific time period or searching the whole source computer system 10 to fine modified files in order to backup at once. Therefore, the efficiency of the backup and the transmission speed of the network are improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A real-time remote backup system used in a network system connecting at least one source computer system and one destination computer system, each computer system consisting of a kernel space and a user space, and the backup system comprising:
    a loadable kernel module that pre-sets up at least a specific system call defined by a user within the kernel space of the source computer system, receiving a notification generated from the pre-set system call to generate a corresponding file modification message when a file modification event conforming to the specific system call occurs in the user space of the source computer system;
    a scheduling module queuing each said file modification message from the loadable kernel module, and then generating a corresponding backup command in response to each said file modification message; and
    at least one network backup unit installed in the source computer system, in accordance with a file information of a known modified file provided within the backup command, performing a checksum test to determine a variant part of the known modified file and backing-up the variant part of the known modified file through the network system to the destination computer system when receiving each backup command transmitted from the scheduling module.

2. The backup system of claim 1 wherein the loadable kernel module further comprises a replacement unit for replacing an original system call in the source computer system with the specific system call.

3. The backup system of claim 2, further including a graphical user interface (GUI) having an automatic network backup switch for enabling the user to switch on/off an automatic network backup function, so that the replacement unit of the loadable kernel module will switch to the original system call when the automatic network backup function is switched off.

4. The backup system of claim 1 wherein the loadable kernel module further comprises:
    a call determining unit determining whether the specific system call is one of a plurality of predetermined system calls; and
    a message processing unit generating the file modification message to the scheduling module, when the call determining unit determines that the specific system call is one of a plurality of predetermined system calls.

5. The backup system of claim 1 wherein the file modification message comprises at least the filename and the path of the known modified file.

6. The backup system of claim 1, wherein the scheduling module further comprises a queue unit for accommodating the file modification messages in sequence from the loadable kernel module.

7. The backup system of claim 6, wherein the scheduling module further comprises a schedule managing unit for queuing sequentially each said message into the queue unit, and a schedule processing unit for sequentially reading the messages out the queue unit and transmitting the backup commands according to the messages.

8. The backup system of claim 7 wherein the schedule managing unit and the schedule processing unit use a same algorithm.

9. The backup system of claim 8 wherein the algorithm used by both the schedule managing unit and the schedule processing unit is in coordination with an algorithm used by the network backup unit to prevent data from losing during the transmission process of said message and command.

10. The backup system of claim 9 wherein the schedule managing unit and the schedule processing unit respectfully have at least one specific thread for defining an adjustable optimized time interval.

11. The backup system of claim 1 wherein the backup command comprises at least a path of the known modified file.

12. The backup system of claim 1 wherein the destination computer system further comprises another one same network backup unit for receiving backup data from the source computer system.

13. A real-time remote backup system installed in a source computer system connected to a destination computer system through a network system, each computer system comprising at least one kernel space for a kernel and a user space for a network backup unit, and the backup system comprising:
    a loadable kernel module that pre-sets up at least one specific system call defined by a user in the kernel space of the source computer system, generates a corresponding file modification message, according to the type of the system call, to notify the kernel when a file modification event conforming to the specific system call occurs in the user space of the source computer system, wherein the loadable kernel module comprises a replacement unit for replacing an original system call in the source computer system with the specific system call; and
    a scheduling module sequentially queuing and processing each said file modification message transmitted from the loadable kernel module to generate a corresponding backup command to facilitate that the network backup unit of the source computer system backs-up a modified file to the destination computer system through the network system.

14. The backup system of claim 13, wherein the file modification message comprises at least a filename and a path of the modified file.

15. The backup system of claim 13, wherein the backup command comprises at least a path of the modified file.

16. A method of real-time remote backup used in a network system interconnecting between at least one source computer system and one destination computer system, each computer system consisting of a kernel space and a user space, and the method comprising:
- implementing a specific system call defined by a user that is pre-loaded by a loadable kernel module in the kernel space of the source computer system, to notify a kernel of the source computer system of a file modification event when the tile modification event conforming to the specific system call occurs in the user space of the source computer system;
- notifying the loadable kernel module of said file modification event to determine whether a file modification message should be generated with reference to the type of the specific system call, as soon as the specific system call is implemented;
- queuing in sequence each said file modification message into a queue unit;
- sequentially taking and processing the file modification messages from the queue unit to generate a corresponding backup command; and
- utilizing a network backup unit for performing a checksum test to determine a variant part of a known modified file according to a file information of the known modified file provided therein and backing-up the variant part of the known modified file to the destination computer system through the network.

17. The method of claim 16, wherein the file modification message comprises at least a filename and a path of the modified file.

18. The method of claim 16, wherein the backup command comprises at least a path of the modified file.

19. The method of claim 16, wherein the loadable kernel module only generates the file modification message if the system call is one of a plurality of predetermined system calls.

20. A real-time remote backup, system used in a network system connecting at least one source computer system and one destination computer system, each computer system consisting of a kernel space and a user space, and the backup system comprising:
- a loadable kernel module that pre-sets up at least a specific system call within the kernel space of the source computer system to generate a corresponding file modification message when a file modification event occurs in the user space of the source computer system;
- at least one network backup unit installed in the source computer system, in accordance with a file information provided within the backup command, backing-up a variant part of a file through the network system to the destination computer system when receiving a backup command;
- a schedule managing unit for queuing sequentially each said message into a queue unit; and
- a schedule processing unit for sequentially reading the messages from the queue unit and transmitting backup commands according to the messages;
- wherein both the schedule managing unit and the schedule processing unit use an algorithm which is in coordination with an algorithm used by the network backup unit.

21. The backup system of claim 20 wherein the schedule managing unit and the schedule processing unit respectfully have at least one specific thread for defining an adjustable optimized time interval.

* * * * *